(12) United States Patent
Charland (10) Patent No.: US 7,853,276 B2
(45) Date of Patent: Dec. 14, 2010

(54) MOBILE COMMUNICATION TERMINAL AND METHOD (75) Inventor: Michael J. Charland, Vancouver (CA)

(73) Assignee: Nokia Corporation, Espoo (FI)

( * ) Notice: Subject to any disclaimer, the term of this patent is extended or adjusted under 35 U.S.C. 154(b) by 684 days.

(21) Appl. No.: 11/549,229

(22) Filed: Oct. 13, 2006

(65) Prior Publication Data

US 2008/0090596 A1    Apr. 17, 2008

(51) Int. Cl.
*H04W 4/00* (2009.01)
*G06F 3/033* (2006.01)
*G09G 5/08* (2006.01)

(52) U.S. Cl. .................. 455/466; 345/159; 345/168; 345/169

(58) Field of Classification Search .................. 455/466
See application file for complete search history.

(56) References Cited

U.S. PATENT DOCUMENTS

| 5,079,546 | A | * | 1/1992 | Hyakutake | ................ 345/156 |
| 5,634,134 | A | | 5/1997 | Kumai | |
| 6,182,099 | B1 | | 1/2001 | Nakasato | |
| 6,396,482 | B1 | | 5/2002 | Griffin | |
| 6,498,601 | B1 | * | 12/2002 | Gujar et al. | ................ 345/173 |
| 6,587,675 | B1 | * | 7/2003 | Riddiford | ................ 455/575.1 |
| 7,461,105 | B2 | * | 12/2008 | Wiggeshoff | ................ 708/145 |
| 2003/0063739 | A1 | * | 4/2003 | Otsuka | ................ 379/433.07 |
| 2003/0193478 | A1 | * | 10/2003 | Ng et al. | ................ 345/168 |
| 2004/0177179 | A1 | * | 9/2004 | Koivuniemi | ................ 710/67 |
| 2004/0267884 | A1 | * | 12/2004 | Sar-Shalom | ................ 709/206 |
| 2006/0288297 | A1 | * | 12/2006 | Haitani et al. | ................ 715/739 |
| 2007/0013673 | A1 | * | 1/2007 | Minari | ................ 345/173 |
| 2007/0200828 | A1 | * | 8/2007 | Skillman et al. | ................ 345/169 |
| 2007/0236461 | A1 | * | 10/2007 | Griffin et al. | ................ 345/169 |

FOREIGN PATENT DOCUMENTS

EP    1615111 A1    1/2006

OTHER PUBLICATIONS

International Search Report, PCT/IB2007/003045.

* cited by examiner

*Primary Examiner*—Lester Kincaid
*Assistant Examiner*—Yu (Andy) Gu (57) ABSTRACT

A method for providing convenient switching between modes of character input on a communication terminal in connection with currency input. The method includes in a first mode of input, receiving at least one alphanumerical input character, recognizing at least one alphanumerical input character from a set of predetermined currency identifiers, and switching to a second mode of input.

11 Claims, 9 Drawing Sheets

MOBILE COMMUNICATION TERMINAL AND METHOD

TECHNICAL

The disclosed embodiments relate to a method for switching between modes of character input in connection with currency input, especially implemented on a communications terminal. It further relates to a communication terminal in which the disclosed embodiments are implemented. It furthermore relates to a computer program product arranged to perform said method.

BACKGROUND

Typing characters on a mobile device, such as a mobile phone, with a numerical keypad is often cumbersome. It is especially troublesome when a user wants to swiftly type characters such as currency symbols in combination with numerical and alphanumerical characters. Typing these combinations of characters often requires several key-inputs to change between different input modes. This is especially problematic when the apparatus have a small physical size with even smaller keys.

Various solutions for enabling entering of any character from a wide range of characters with a limited set of keys exist, for instance by use of combinations of keys, special menus or modes accessed via a certain designated key, for instance. However, improvements can yet be made to facilitate procedures of input for a user to more easily type combinations of characters requiring different input modes.

SUMMARY OF THE INVENTION

In view of the above, an objective of the invention is to solve or at least reduce the problems discussed above. In particular, an objective is to provide a swifter and more user friendly way of typing combinations of characters requiring different input modes.

According to a first aspect of the disclosed embodiments, there is provided a method for providing convenient switching between modes of character input on a communication terminal in connection with currency input, comprising:

in a first mode of input, receiving at least one alphanumerical input character;

recognizing said at least one alphanumerical input character from a set of currency identifiers; and switching to a second mode of input.

Hence, as an advantage, switching between two sets of characters, such as alphanumerical and numerical, may be performed automatically by a communications terminal upon receiving input associated with a currency. As a further advantage, it is not necessary to toggle between various modes of input. This is of particular importance when speed is an issue, such as for instance in a scenario where price information must be provided in an expediate manner. Any form of restricting input can then be advantageous. The registered at least one alphanumerical input character may for instance be a currency symbol.

According to one embodiment, the first mode of input is alphanumerical, and said second mode of input is numerical. Hence, as an advantage, a convenient way of switching between an alphanumerical set of characters and a set of numerical characters is provided.

According to another embodiment, the currency identifiers are any of the following characters: a plus (+) sign, any of the currency symbols £ (Pound), $ (Dollar), € (Euro), £ (Egyptic Pound), F(Franc), ¥ (Yen) or any combinations thereof.

According to one embodiment, the method may further comprise switching back to said first mode upon receiving a space-key input, for instance involving a prolonged press and hold of said space-key. The wording prolonged is to be interpreted as longer than a threshold time, for instance of one second, half of a second, or a quarter of a second. Thus, with a single key input, the cursor indicating input position is moved to a new position, and at the same time, the input mode is switched back to the original mode of input, for instance alphanumerical. Hence, as an advantage, a chain of input modes from alphanumerical, to numerical, and back to alphanumerical has been achieved in a very limited number of key inputs.

According to another embodiment, the at least one alphanumerical input character comprises a sequence of alphanumerical input characters, and the currency identifiers comprises a set of predetermined alphanumerical character sequences. Hence, any currency, for instance according to the commonly used three-letter combination where, for instance, "SEK" represents the Swedish currency, "DKK" represents the Danish currency, and "USD" represents the United States Dollar. Of course, any other currency represented by a three-letter code or abbreviation may be used. Actually, any number of letters in such a combination may be used, as long as it is widely known, thus making it useful.

The currency input of the method may advantageously be performed in connection with inputting text for an item selected from the group composing a message, a note, a reminder, a calendar item. As an advantage, the method is available in all the common environments or applications a user may enter currencies in. A message may be selected from the group of a short message (SMS), and a multimedia message (MMS).

The above advantage and feature together with numerous other advantages and features, which will become evident from below detailed description, are obtained according to a second aspect of the disclosed embodiments by a mobile communication terminal for providing convenient switching between modes of character input in connection with currency input, said mobile communication terminal comprising a controller, wherein:

said controller being configured in a first mode of input, to receive at least one alphanumerical input character;

said controller further being configured to recognize said at least one alphanumerical input character from a set of predetermined currency identifiers; and said controller further being configured to, as a response to said recognition, switch to a second mode of input.

The above object, advantage and feature together with numerous other objects, advantages and features, which will become evident from below detailed description, are obtained according to a third aspect of the disclosed embodiments by a computer program product comprising software instructions that, when executed in an electronic apparatus, performs the method according to the first aspect of the invention.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional features and advantages of the disclosed embodiments, will be better understood through the following illustrative and non-limiting detailed description of preferred embodiments, with reference to the appended drawings, where the same reference numerals will be used for similar elements, wherein.

DETAILED DESCRIPTION OF PREFERRED EMBODIMENTS

Figure 1:
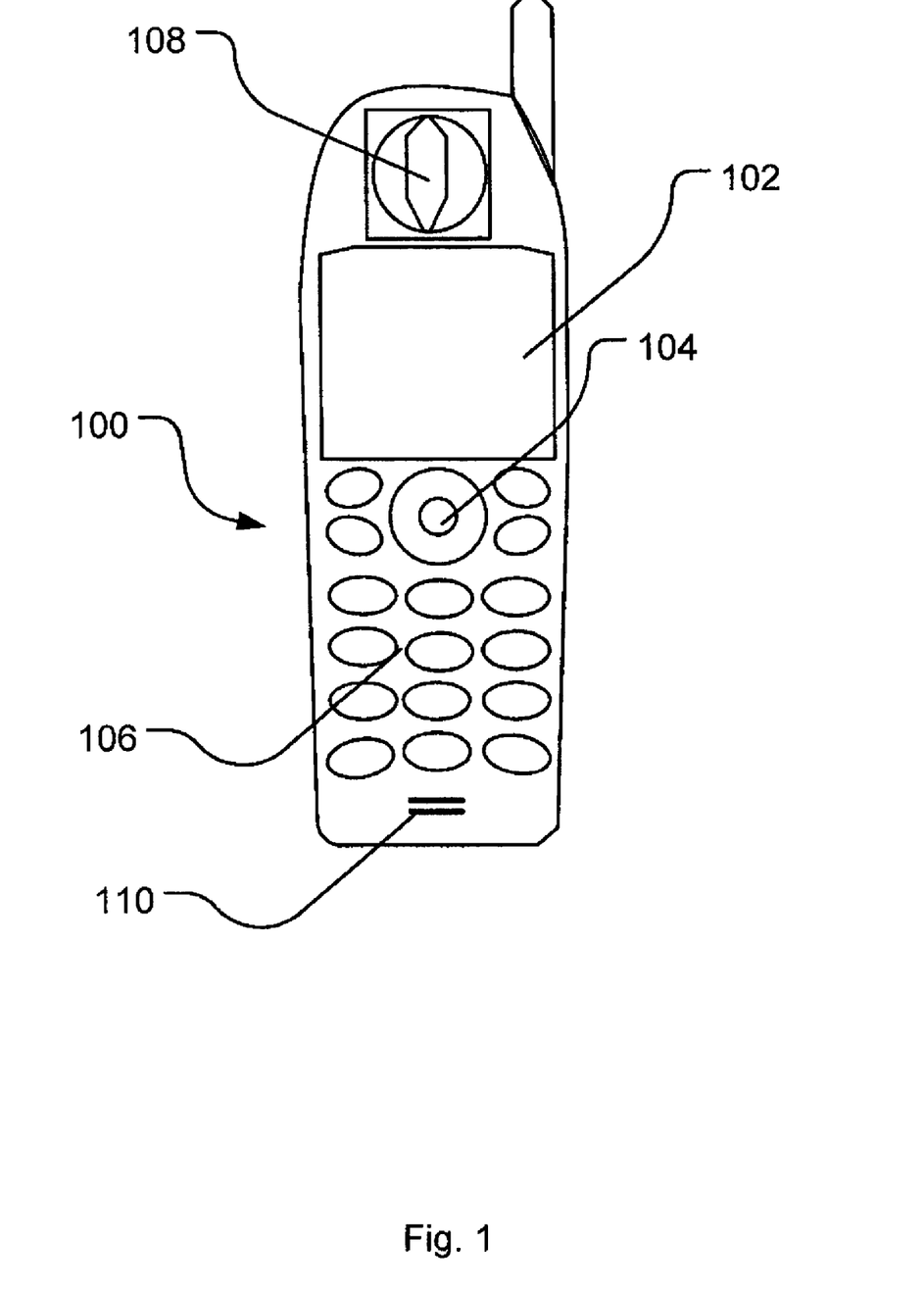
FIG. 1 shows a mobile communication apparatus according to an embodiment.

FIG. 1 shows a mobile communication apparatus 100 comprising a display 102 and means 104 for navigating among items (not shown) displayed in a display area 102. The navigation means 104 can be a rotating input, a joystick, or a touch pad. The mobile communication apparatus can also comprise other elements normally present in such an apparatus, such as a keypad 106, a speaker 108, a microphone 110, a processor (not shown), a memory (not shown), etc.

Figure 2:
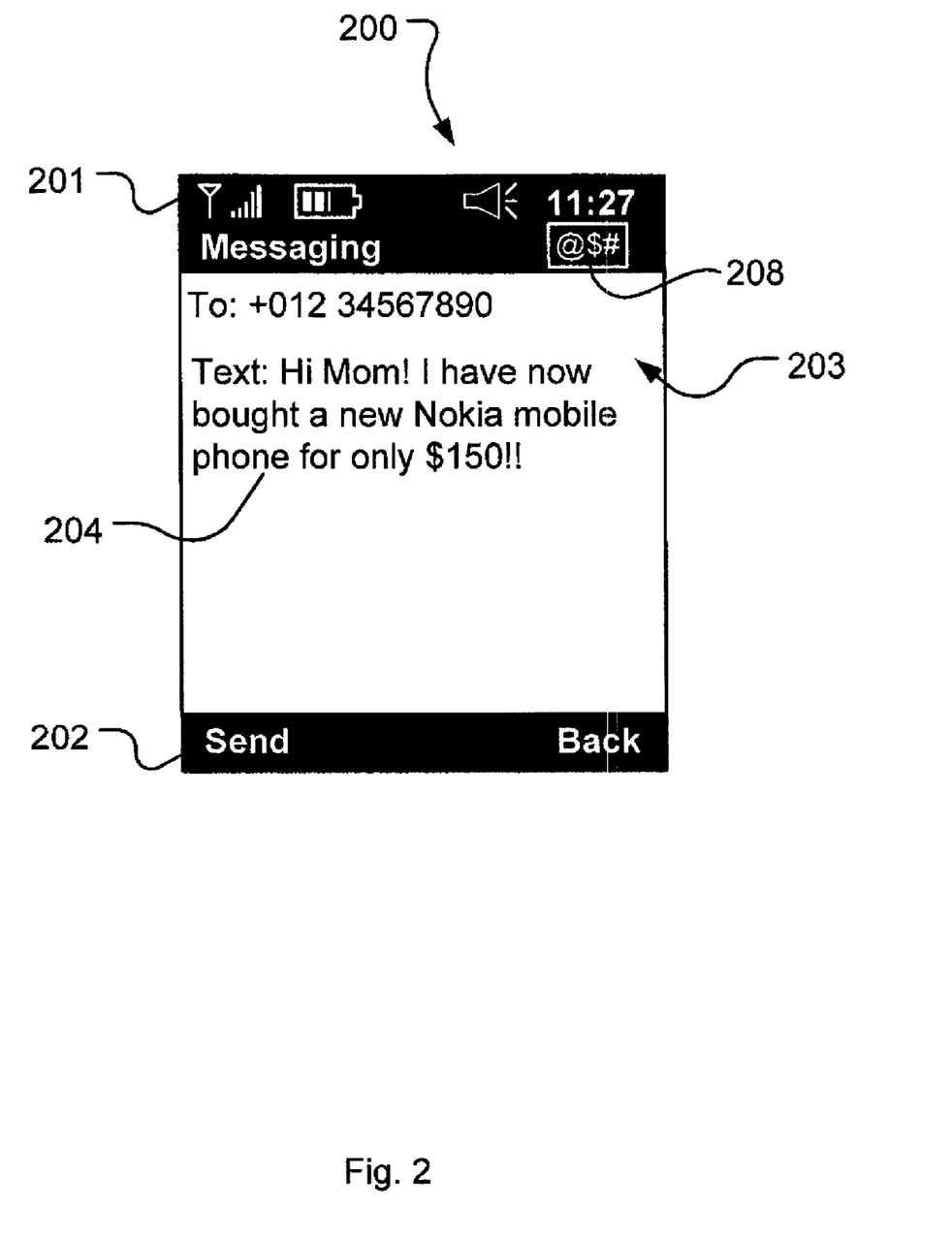
FIG. 2 shows a display view on a mobile device.

FIG. 2 illustrates an example of a common display view 200 in a mobile communication apparatus 100 comprising a general status indication section 201, a softkey bar 202 and a general display area 203. The general status indication section 201 can for example include symbols for battery status, reception quality, speaker on/off, present typing mode 208, clock time, etc. The status indication section is not in any way limited to only include these symbols. Thus, other symbols in any shape, form or colour can occur. The softkey bar 202, situated at the bottom of the display view, is operable using the navigation means 104 mentioned in conjunction with FIG. 1. The function of these softkeys are not limited by the functions indicated in the figure. The preferred function of the general display area 203, residing between the status indication section 201 at the top and the softkey bar 202 at the bottom, is to display information from running applications in the mobile communication apparatus.

In FIG. 2 a messaging application is running on the display view 200. The display area 203 shows text 204, consisting of a recipients' phone number and the text message that will be sent to the recipient, manually entered by a user via the keys on the keypad 106.

Figure 3:
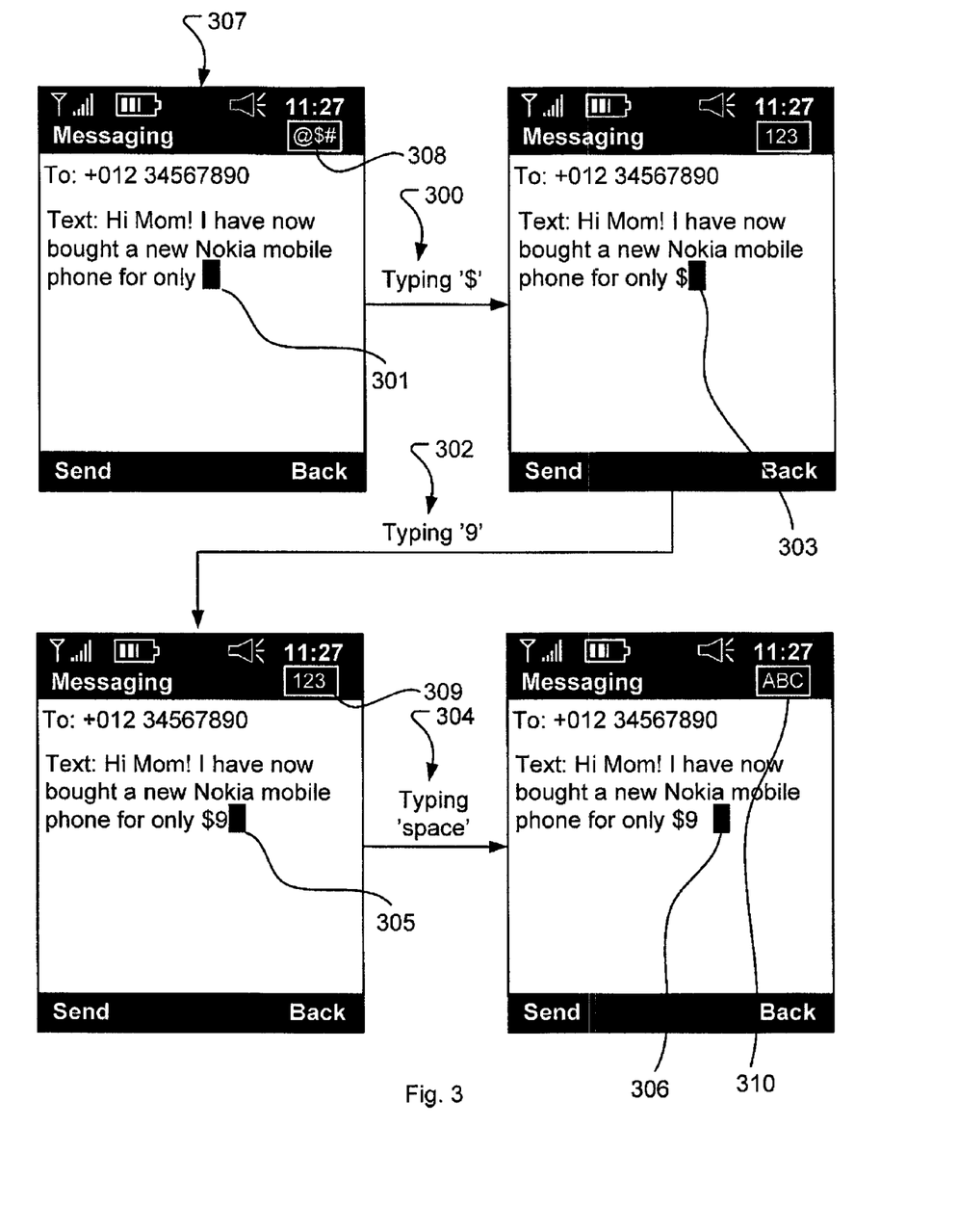
FIG. 3 illustrates a typing sequence in a display view according to an embodiment.

FIG. 3 shows an example of a character typing sequence displayed in a common display view 307 of a mobile communication apparatus 100. In FIG. 3 the cursor 301 indicates the location in the text where a character currently can be inserted by manoeuvring the keys on the keypad 106. To be able to type any character (a number, a letter or a symbol) with a limited set of keys, different input modes are frequently used. The input modes can consists of, but not limited to, a 'number mode' (0-9), 'alphanumeric mode' (a-z) and 'symbol mode' (£,$,#,¤, etc.). The current input mode is indicated in the display view 308.

In FIG. 3, a user wants to enter a '$' currency symbol and has therefore set the current character input mode of the display view 307 to 'symbol mode' 308, indicated the characters '@$#' inside a box. A user then types the character currency symbol '$' 300 via the keypad 106. A '$'-symbol is then displayed in the text, in the display view, and the cursor moves one position 303 to the right and the input mode is changed from 'symbol mode' to a 'numerical mode', since an amount often is inputted as a number after the '$' currency character. The 'numerical mode' is indicated by the characters '123' in a box 309. A user starts to input the amount by typing the number '9' 302, which is displayed in the display view 305. The cursor in the display view 305 automatically shifts one position to the right and the character input mode stays in the 'numerical mode', since additional numbers often are inputted to make up an amount. A user then types a 'space' (blank, arrow or any other character or presses a preset navigation button 104) 302, which is displayed in the display view. The cursor shifts one position to the right 306 and the character input mode changes to an 'alphanumerical mode', since the typing of the amount is ended by the insertion of a space between the previous number and the following alphanumerical character. The 'alphanumerical mode' is indicated by the characters 'ABC' in a box 309. By automatically detecting and changing the character input mode the user saves a number of extra steps toggling between different character input modes.

Figure 4:
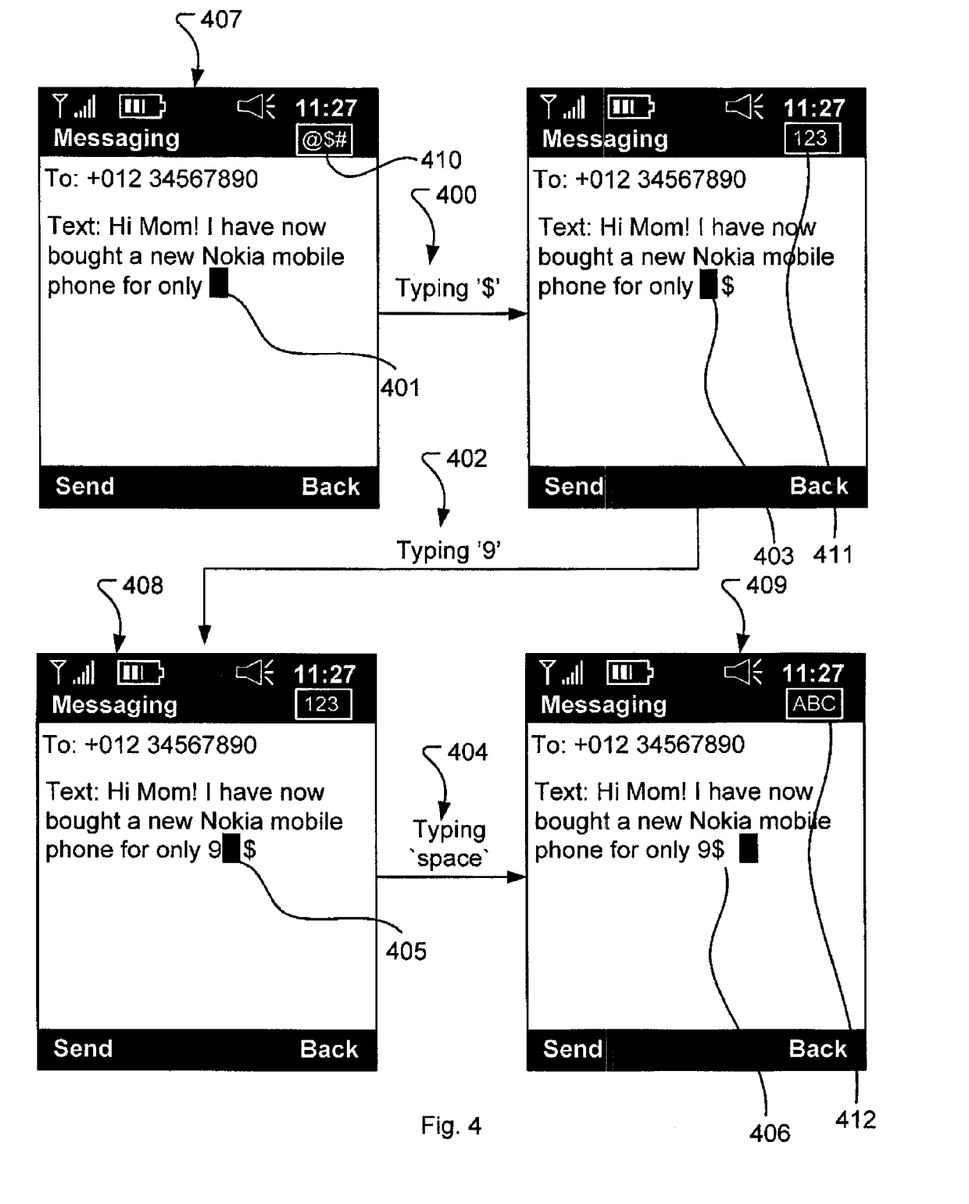
FIG. 4 illustrates a typing sequence in a display view according to an embodiment.

FIG. 4 illustrates an example of a typing sequence in a common display view 407 in a mobile communication apparatus 100. In FIG. 4, the cursor 401 indicates the location in the text where a character currently can be inserted by manoeuvring the keys on the keypad 106. A user want to enter a '$' currency symbol and has therefore set the current character input mode of the display view 407 to 'symbol mode' 410. A user then types the character currency symbol '$' 400 on the keypad 106. A '$' currency symbol is then displayed in the text, in the display view, and the cursor stays in the same position 403 and the '$' currency symbol is inserted to the right of the '$' currency symbol 403. The input mode is changed from 'symbol mode' to a 'numerical mode' 411, since a number (amount) often is inputted in conjunction with an '$' currency symbol. A user starts to input the amount by typing the number '9' 402. The cursor 405 automatically shifts one position to the right and the number '9' is inserted in the cursors previous position. The character input mode stays in the 'numerical mode', since additional numbers often are inputted to make up an amount. A user then types a 'space' 404 to indicate that the whole amount is entered. The cursor shifts two position to the right 406 and the '$' currency symbol is placed after the last number of the amount (to the right of the amount. The character input mode changes to an 'alphanumerical mod' 412, since the typing of the amount is ended by the typing of a space. Also in this case the automatically detecting and changing the character input mode the user saves a number of extra steps toggling between different character input modes and moving the cursor.

Figure 5:
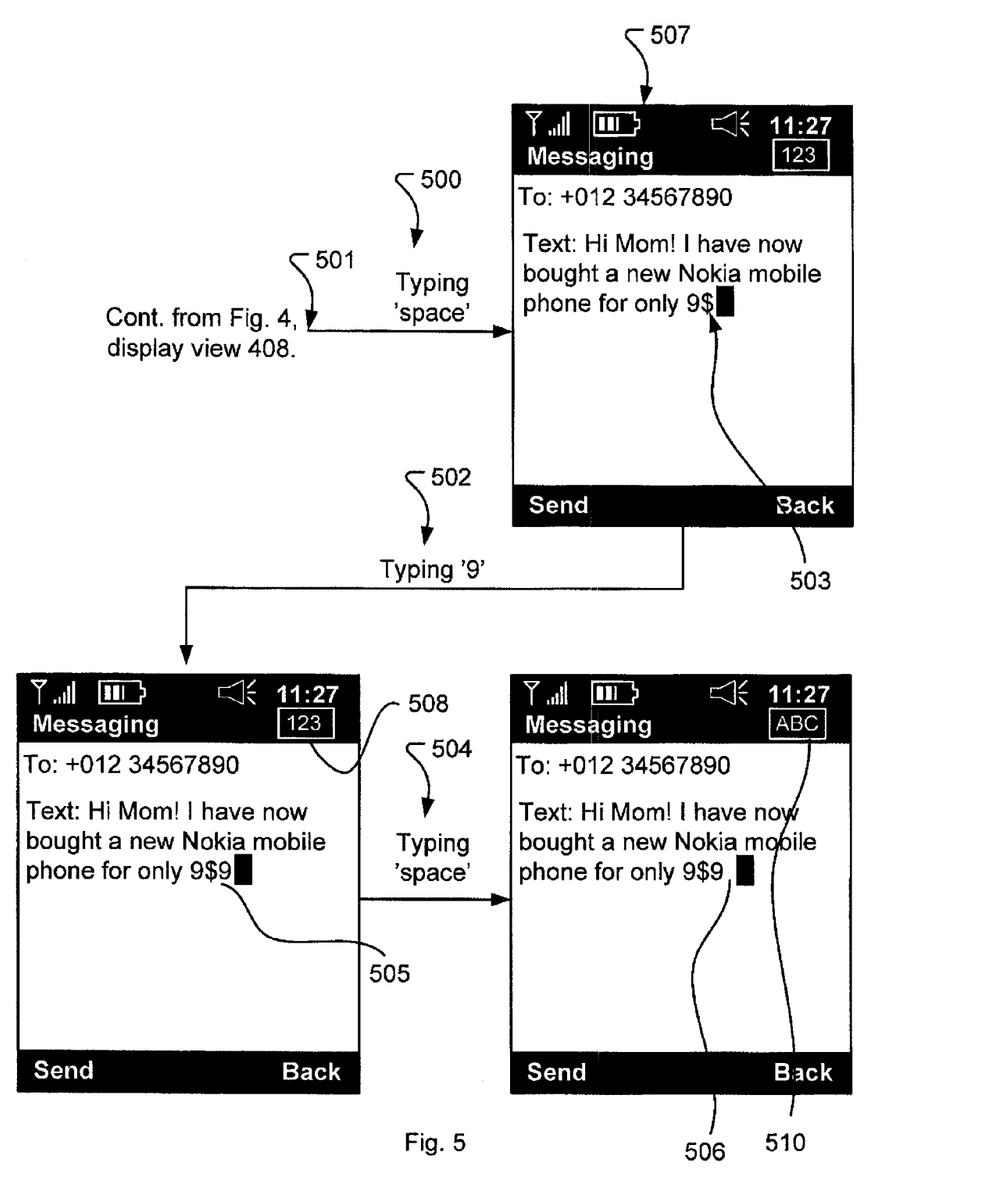
FIG. 5 illustrates a typing sequence in a display view according to an embodiment.

FIG. 5 illustrates an example of a typing sequence in a common display view 507 in a mobile communication apparatus 100. The typing sequence shown in FIG. 5 is a continuation 501 from display view 408 in FIG. 4. When a user, in 408 in FIG. 4, types a 'space' 500 the cursor 405, in the example in FIG. 5, shifts two steps to the right and the '$' currency symbol shifts one position to the left 503. If another typing of an 'space' is done, which will indicate that the whole amount has been entered, the cursor will move one position to the right and change to an 'alphanumerical mod', ending up as display view 409 in FIG. 4. However, if a user types a number '9' the cursor moves one step to the right and a '9' is displayed to the right of the '$' symbol 505 indicating the amount of cents. The mode does not change. If a user types 'space', indicating that the full amount has been entered, the cursor moves one position to the right and the mode changes from 'numerical mode' to 'alphanumerical mode' 510.

Figure 6A:
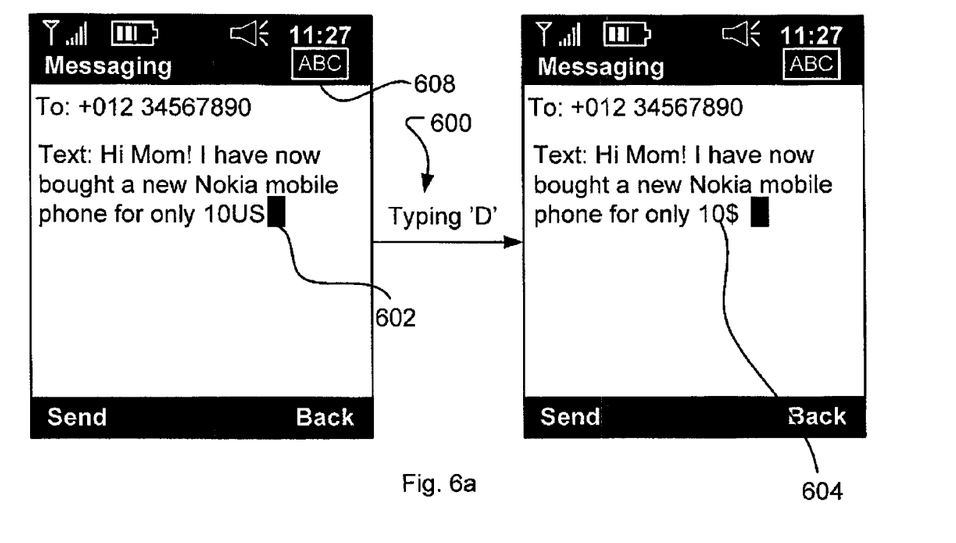
FIG. 6 illustrates a typing sequence in a display view according to an embodiment.

FIG. 6a illustrates an example of a typing sequence in a common display view 307 in a mobile communication apparatus 100. If a user has typed '10US' 602, as shown in FIG. 6a, and types 'D' 600, thus completing the character sequence USD (US Dollar) the cursor stays in the same position 604 and USD is substituted by '$', placed after the amount 604 (or before), which has a symbolical meaning equal to USD. The mode is unchanged, and it is still in a 'alphanumerical mode'.

Figure 6B:
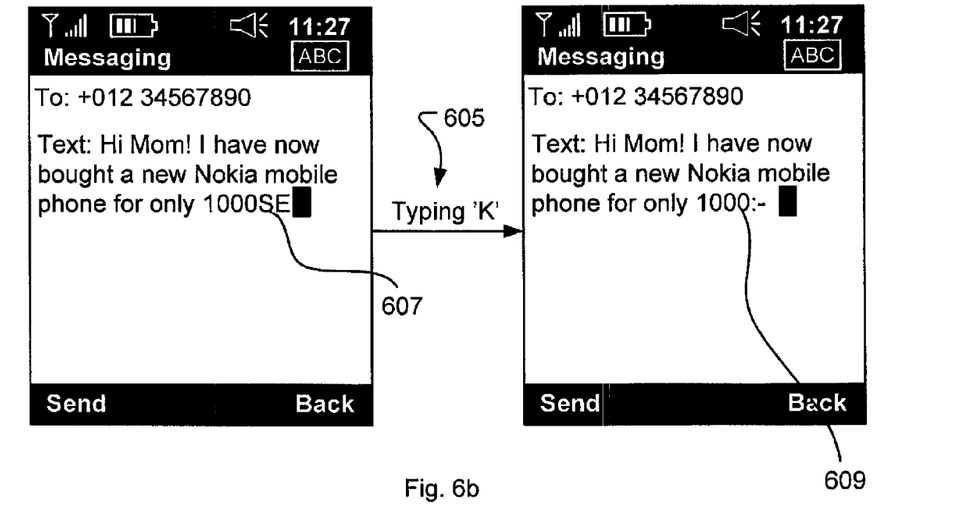

FIG. 6b illustrates an example of a typing sequence in a common display view 307 in a mobile communication apparatus 100. If a user has typed '1000SE' 605, as shown in FIG. 6b, and types 'K' 605, thus completing the character sequence SEK (Swedish Kroner) the cursor moves one position to the right 609 and SEK is substituted by ':-' which has a symbolical meaning equal to SEK. The mode is unchanged, and it is still in a 'alphanumerical mode'.

Figure 7:
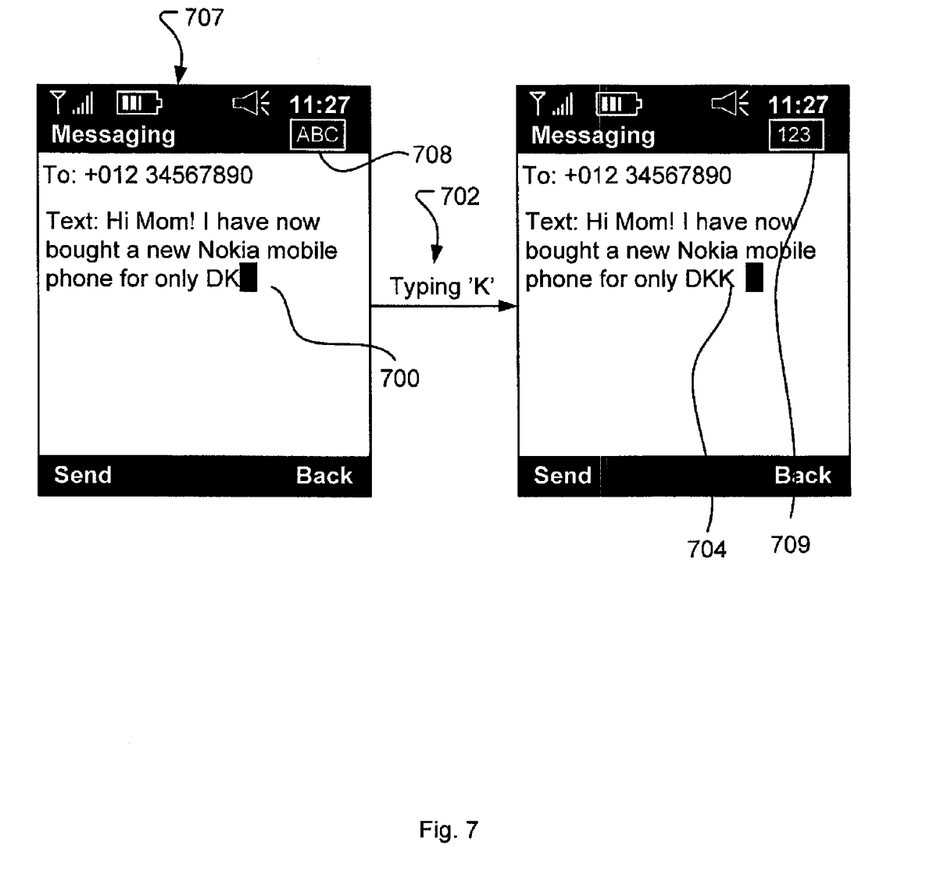
FIG. 7 illustrates a typing sequence in a display view according to an embodiment.

FIG. 7 illustrates an example of a typing sequence in a common display view 707 in a mobile communication apparatus 100. If a user has typed 'DK' 700, as shown in FIG. 7, and types 'K' 702, thus completing the character sequence DKK (Danish Kroner) the cursor moves one position to the right 704 and the mode changes from 'alphanumerical mode' 708 to 'numerical mode' 709 since generally the character sequence DKK is followed by an amount.

Figure 8:
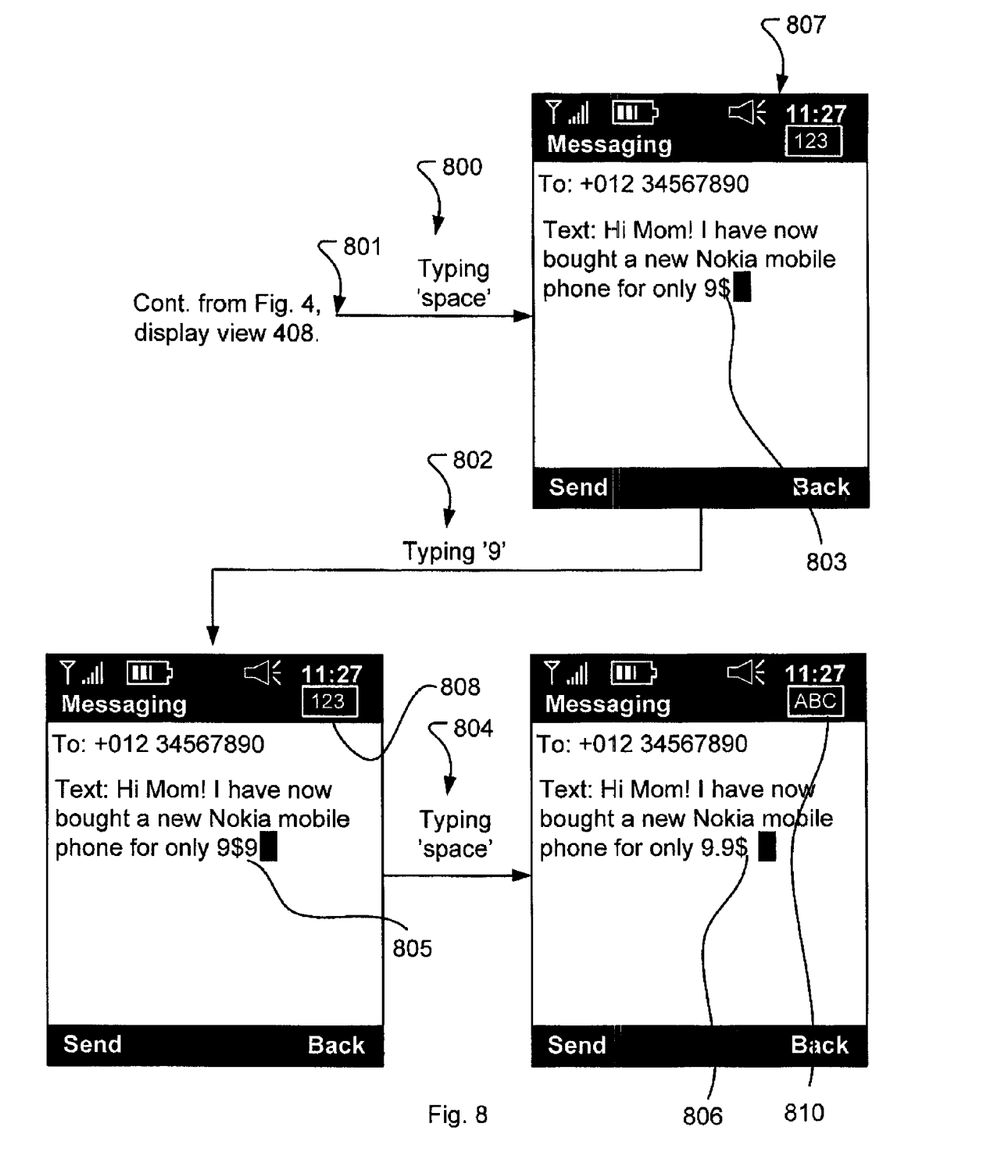
FIG. 8 illustrates a typing sequence in a display view according to an embodiment.

FIG. 8 illustrates an example of a typing sequence in a common display view 807 in a mobile communication apparatus 100. The typing sequence shown in FIG. 8 is an continuation 801 from display view 408 in FIG. 4. When a user, in 408 in FIG. 4, types a 'space' 800 the cursor 405, in the example in FIG. 4, shifts one steps to the right and the '$' currency symbol shifts one position to the left 803. If another typing of an 'space' is done, which will indicate that the whole amount has been entered, the cursor will move one position to the right, and change mode from a 'numerical mode' to an 'alphanumerical mod', ending up as display view 409 in FIG. 4. However, if a user, in display view 807, types another number '9' 802 the cursor moves one step to the right and a '9' is displayed to the right of the '$' symbol 805. The character mode does not change 808. If a user types 'space', indicating that the full amount has been entered, the cursor moves two positions to the right and the '$' symbol and number '9' changes palaces and a period is inserted between the two number '9' 806. The mode changes from numerical mode, 808 to 'alphanumerical mode' 810.

Figure 9:
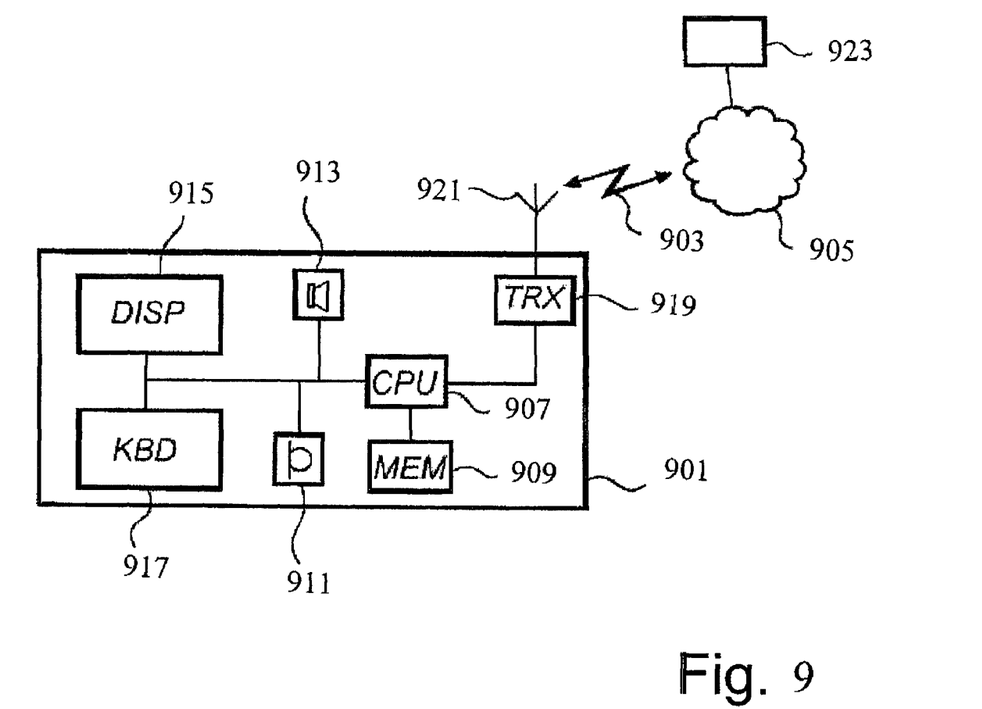
FIG. 9 shows a communications terminal network.

FIG. 9 illustrates schematically a communication terminal 901 in which the disclosed embodiments are implemented. The terminal 901 is capable of communication via an air interface 903 with a radio communication network 905 such as the well known systems CDMA2000, D-AMPS, GSM, UMTS, EDGE, etc. The terminal comprises a processor 907, memory 909 as well as input/output units in the form of a microphone 911, a speaker 913, a display 915 and a keyboard 917. Radio communication is realized by radio circuitry 919 and an antenna 921. Connected to the radio communication network 905 is a controller 923. The details regarding how these units communicate are known to the person skilled in the art and is therefore not discussed further.

The above referenced and illustrated embodiments are not limited to the currencies presented, and hence, the invention may be implemented for any currency available.

The disclosed embodiments are not limited to using three input modes. Fewer, or more, input modes could also be used.

It should furthermore be pointed out, that any of the alternative embodiments may be configured to a communications terminal by default, and any of the remaining alternatives embodiments may be user selected at any time.

Hence, in other words, the disclosed embodiments can be described as providing a communications terminal with a method, implemented for instance by a software program product, which upon recognition of selection of a currency symbol, automatically changes input mode, such that the next entered character will be a number. Hence, the extra step of selecting number mode is eliminated because a number normally always is provided in connection with a currency symbol such as the '£, $, €' signs.

As a further embodiment of the disclosed embodiments, a numerical followed by for instance "KR" or "kr", such as "100kr", may automatically be changed to "100:-". Hence, as an advantage, providing a convenient input of currency and an associated amount.

The invention claimed is:

1. A method comprising:
    in a first mode of input on a communication terminal, detecting an input by an input device of at least one alphanumerical input character corresponding to a currency identifier;
    automatically switching to a second mode of input on the communication terminal, in response to detecting the currency identifier, wherein said first mode of input is alphanumerical, and said second mode is numerical; and
    switching back to said first mode upon detecting a space input.

2. The method according to claim 1, wherein said alphanumerical input character is a currency symbol.

3. The method according to claim 1, wherein said set of currency identifiers comprises any of the following characters: a plus (+) sign, any of the currency symbols £, $, €, ₤, ₣, ¥ or any combinations thereof.

4. The method according to claim 1, wherein said receiving a space input comprises switching back to said first mode in response to a prolonged press and hold of said space input.

5. The method according to claim 1, wherein said at least one alphanumerical input character comprises a sequence of alphanumerical input characters, and said currency identifiers comprises a set of predetermined alphanumerical character sequences.

6. The method according to claim 1, wherein said currency input is performed in connection with inputting text for an item selected from the group comprising a message, a note, a reminder, a calendar item.

7. The method according to claim 6, wherein said message is a multimedia message or a short message.

8. A computer program product comprising software instructions that, when executed in an electronic apparatus, performs the method according to claim 1.

9. The method of claim 1 further comprising that in the first mode of input, an input to the input device of the terminal produces an alphanumeric output and in the second mode of input, an input to the terminal produces only a numerical output.

10. The method of claim 1 further comprising:
    detecting, in the first mode of input, an input to the input device that comprises a sequence of characters corresponding to a currency symbol in the set of currency identifiers;

converting the sequence of characters into the currency symbol; and presenting the currency symbol on a display of the terminal while keeping the communication terminal in the first mode of input.

11. An apparatus comprising:

an input device configured to receive character inputs;

a controller; and a memory including computer program code;

the memory and the computer program code configured to, with the controller, cause the apparatus to:

in a first mode of input, detect an input from the input device of at least one alphanumerical input character corresponding to a currency identifier from a set of predeterimined currency identifiers;

in response to detecting the currency identifier, automatically switching to a second mode of input wherein said first mode of input is alphanumerical, and said second mode is numerical; and switching back to said first mode upon detecting a space input.

* * * * *

UNITED STATES PATENT AND TRADEMARK OFFICE
CERTIFICATE OF CORRECTION

| | | |
|---|---|---|
| PATENT NO. | : 7,853,276 B2 | Page 1 of 1 |
| APPLICATION NO. | : 11/549229 | |
| DATED | : December 14, 2010 | |
| INVENTOR(S) | : Charland | |

It is certified that error appears in the above-identified patent and that said Letters Patent is hereby corrected as shown below:

Column 6, line 55, after "A computer program product" insert --stored in a memory storage medium--, therefor.

Column 8, line 4, delete "predeterimined" and insert --predeterminded--, therefor.

Signed and Sealed this
Second Day of August, 2011

David J. Kappos
*Director of the United States Patent and Trademark Office*